US012120135B2

(12) United States Patent
Wahbo

(10) Patent No.: US 12,120,135 B2
(45) Date of Patent: Oct. 15, 2024

(54) SYSTEM AND METHOD TO DETECT MALICIOUS ACTIVITY THROUGH DETECTING ANOMALIES IN SINKHOLED TRAFFIC

(71) Applicant: Saudi Arabian Oil Company, Dhahran (SA)

(72) Inventor: Faisal Talal Wahbo, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 389 days.

(21) Appl. No.: 17/450,675

(22) Filed: Oct. 12, 2021

(65) Prior Publication Data

US 2023/0115935 A1 Apr. 13, 2023

(51) Int. Cl.
*H04L 9/40* (2022.01)
*G06N 20/00* (2019.01)
(52) U.S. Cl.
CPC ......... *H04L 63/1425* (2013.01); *G06N 20/00* (2019.01)
(58) Field of Classification Search
CPC ............... H04L 63/0236; H04L 67/563; H04L 63/1408; H04L 63/1425; H04L 63/0421; H04L 63/14; G06N 20/00
See application file for complete search history.

(56) References Cited

U.S. PATENT DOCUMENTS

| 8,601,575 | B2 | 12/2013 | Mullarkey et al. | |
| 9,591,018 | B1* | 3/2017 | Zakian | H04L 63/1408 |
| 9,838,411 | B1 | 12/2017 | Aziz | |
| 9,985,988 | B2 | 5/2018 | Gukal et al. | |
| 10,965,706 | B2 | 3/2021 | Harris et al. | |
| 11,630,717 | B2* | 4/2023 | Vutukuru | G06F 11/0787 714/48 |
| 2006/0212572 | A1 | 9/2006 | Afek et al. | |
| 2010/0115617 | A1 | 5/2010 | Weber et al. | |
| 2013/0227550 | A1* | 8/2013 | Weinstein | G06F 9/45558 718/1 |

(Continued)

OTHER PUBLICATIONS

Office Action in corresponding Saudi Arabian Application No. 122440357, dated Jul. 24, 2024; 16 pages.

*Primary Examiner* — Ali S Abyaneh
(74) *Attorney, Agent, or Firm* — Leason Ellis LLP

(57) ABSTRACT

An automated method for detecting anomalous activity in a private computer network comprises: collecting, over a current time period at an ingesting network device of the computer network, non-routable network packets routed to the ingesting network device from other network devices of the computer network; parsing the current collected network packets into corresponding current network flow records each including a source field and a destination field representing a non-routable network address; and for each distinct source identified in the source fields of the current network flow records: aggregating the current network flow records of that source into a current aggregated flow record; analyzing the current aggregated flow record using an anomaly detection module trained through machine learning on previous aggregated flow records of that source from previous time periods in order to detect anomalous activity in that source; and acting in response to detecting the anomalous activity in that source.

18 Claims, 8 Drawing Sheets

(56) References Cited

U.S. PATENT DOCUMENTS

| | | |
|---|---|---|
| 2015/0264078 A1 | 9/2015 | Beauchesne et al. |
| 2017/0244749 A1* | 8/2017 | Shulman ............. H04L 63/1441 |
| 2020/0076841 A1 | 3/2020 | Hajimirsadeghi et al. |
| 2020/0162484 A1 | 5/2020 | Solis Agea et al. |
| 2021/0136075 A1 | 5/2021 | Sanghavi et al. |
| 2021/0344690 A1* | 11/2021 | Sharifi Mehr .......... G06F 16/25 |
| 2022/0385635 A1* | 12/2022 | Thimmisetty ....... H04L 63/1425 |

* cited by examiner

SYSTEM AND METHOD TO DETECT MALICIOUS ACTIVITY THROUGH DETECTING ANOMALIES IN SINKHOLED TRAFFIC

FIELD OF THE DISCLOSURE

The present disclosure relates to techniques for detecting malicious activity in private computer networks through detecting anomalies in sinkholed traffic.

BACKGROUND OF THE DISCLOSURE

Enterprises have internal computer networks to facilitate communication between computing devices. In order to secure these networks, a variety of security controls are employed. Some of these security controls (external security controls) work at the network borders and try to stop or detect the attacker (or malware) from getting inside the networks. However, should the malware successfully bypass these security controls and compromise an internal host, the malware can then perform several malicious activities. For example, the malware can spread to other computers in the network, or communicate to an external command and control server to get new commands, or exfiltrate information, to name a few. As another example, the malware can gather more information by scanning the network or moving laterally. To detect these activities, internal security controls are deployed. Most of these deployed internal security controls are signature- or heuristic-based, which detect malicious activity by comparing the activity with already defined patterns of known malicious activity.

Unfortunately, these internal security controls do not work well for new types of malware whose signatures are similar to those of legitimate activities. For these types of malware, other types of internal security controls are used that rely on anomaly detection to detect such malware. However, most such network anomaly detection solutions rely on having a network baseline, such as when network activities are stable or following predictable patterns, for the anomaly detection solutions to be able to detect anomalies without many false positives. Unfortunately, in large network environments, changes happen frequently, which results in many legitimate activities being reported as anomalies. While some such methods try to reduce the number of false anomalies by increasing their detection thresholds, this also reduces the number of malware being detected. Another problem with network anomaly detection solutions is that they analyze all communications within the network, which can be a very compute- and memory-intensive task. This results in high computational, memory, and storage resource requirements.

It is in regard to these and other problems in the art that the present disclosure is directed to provide a technical solution for an effective system and method for detecting malicious activity in a computer network through detecting anomalies in sinkholed network traffic.

SUMMARY OF THE DISCLOSURE

According to a first aspect of the disclosure, an automated method for detecting anomalous activity in a private computer network is provided. The method comprises: collecting, over a current time period by a detection circuit of an ingesting network device of the private computer network, non-routable network packets routed to the ingesting network device from one or more other network devices of the private computer network; and parsing, by the detection circuit, the current collected network packets into corresponding current network flow records each including a source field and a destination field, the source field identifying a source node within the private computer network, the destination field representing a non-routable network address. In addition, for each distinct source identified in the source fields of the current network flow records, the method includes: aggregating, by the detection circuit, the current network flow records of that source into a current aggregated flow record; analyzing, by the detection circuit, the current aggregated flow record using an anomaly detection module trained through machine learning on previous aggregated flow records of that source from previous time periods in order to detect anomalous activity in that source; and acting, by the detection circuit, in response to detecting the anomalous activity in that source.

In an embodiment consistent with the above, the non-routable network address comprises a non-existent destination address or an external destination address requiring a proxy server in order to reach.

In an embodiment consistent with the above, the one or more other network devices comprise one or more routers, switches, or firewalls of the private computer network, or combinations thereof, and the one or more other network devices route all non-routable network packets to the ingesting network device.

In an embodiment consistent with the above, the current network flow records each comprise a corresponding time stamp, source Internet Protocol address (IP address), source port, destination IP address, destination port, and protocol.

In an embodiment consistent with the above, the current aggregated flow record of each source comprises information for the current time period regarding a number of non-routable connections initiated by that source, a number of unique destination IP addresses, a list of destination IP addresses, a number of unique destination ports, and a list of destination ports, as represented by the current network flow records of that source.

In an embodiment consistent with the above, the list of destination IP addresses includes external destination IP addresses whose respective IP addresses are external to the private computer network, and the method further comprises for each distinct source identified in the source fields of the current network flow records, enriching the external destination IP addresses of the current aggregated flow record of that source to include additional information about the external destination IP addresses, but that is not part of the current network flow records of that source, prior to analyzing the current aggregated flow record.

In an embodiment consistent with the above, for each distinct source identified in the source fields of the current network flow records, enriching the external destination IP addresses of the current aggregated flow record of that source comprises: obtaining Internet Protocol (IP) address information or geolocation information about the external destination IP addresses in the current aggregated flow record of that source, but that is not part of the current network flow records of that source; and including the obtained IP address information or geolocation information in the current aggregated flow record of that source.

In an embodiment consistent with the above, for each distinct source identified in the source fields of the current network flow records, analyzing the current aggregated flow record comprises: converting the current aggregated flow record of that source into a feature vector; evaluating the converted feature vector by the anomaly detection module in order to produce a probability of similarity of the converted feature vector to previous such activity of that source, wherein the anomaly detection module is trained through machine learning on previous converted feature vectors of that source from the previous time periods to establish a basis of comparison for the previous such activity of that source; comparing the produced probability to a predefined threshold probability; and detecting the anomalous activity in that source when the produced probability is below the threshold probability, and otherwise not recognizing the anomalous activity of that source.

In an embodiment consistent with the above, acting in response to detecting the anomalous activity in that source comprises one or more of: generating an alert of the detected anomalous activity of that source; reporting, to an analyst, the detected anomalous activity of that source; and correlating the detected anomalous activity of that source to other activity of that source.

In an embodiment consistent with the above, the method further comprises repeating, by the detection circuit, the collecting, parsing, aggregating, analyzing, and acting for each of a plurality of disjoint time periods after the current time period.

According to another aspect of the disclosure, an automated system for detecting anomalous activity in a private computer network is provided. The system comprises: a detection circuit; and a non-transitory storage device storing instructions thereon that, when executed by the detection circuit, cause the detection circuit to: collect, over a current time period at an ingesting network device of the private computer network, non-routable network packets routed to the ingesting network device from one or more other network devices of the private computer network; parse the current collected network packets into corresponding current network flow records each including a source field and a destination field, the source field identifying a source node within the private computer network, the destination field representing a non-routable network address; and for each distinct source identified in the source fields of the current network flow records: aggregate the current network flow records of that source into a current aggregated flow record; analyze the current aggregated flow record using an anomaly detection module trained through machine learning on previous aggregated flow records of that source from previous time periods in order to detect anomalous activity in that source; and act in response to detecting the anomalous activity in that source.

In an embodiment consistent with the system described above, the non-routable network address comprises a non-existent destination address or an external destination address requiring a proxy server in order to reach.

In an embodiment consistent with the system described above, the one or more other network devices comprise one or more routers, switches, or firewalls of the private computer network, or combinations thereof, and the one or more other network devices route all non-routable network packets to the ingesting network device.

In an embodiment consistent with the system described above, the current network flow records each comprise a corresponding time stamp, source Internet Protocol address (IP address), source port, destination IP address, destination port, and protocol.

In an embodiment consistent with the system described above, the current aggregated flow record of each source comprises information for the current time period regarding a number of non-routable connections initiated by that source, a number of unique destination IP addresses, a list of destination IP addresses, a number of unique destination ports, and a list of destination ports, as represented by the current network flow records of that source.

In an embodiment consistent with the system described above, the list of destination IP addresses includes external destination IP addresses whose respective IP addresses are external to the private computer network, and the instructions, when executed by the detection circuit, further cause the detection circuit to, for each distinct source identified in the source fields of the current network flow records, enrich the external destination IP addresses of the current aggregated flow record of that source to include additional information about the external destination IP addresses, but that is not part of the current network flow records of that source, prior to analyzing the current aggregated flow record.

In an embodiment consistent with the system described above, for each distinct source identified in the source fields of the current network flow records, enriching the external destination IP addresses of the current aggregated flow record of that source comprises: obtaining Internet Protocol (IP) address information or geolocation information about the external destination IP addresses in the current aggregated flow record of that source, but that is not part of the current network flow records of that source; and including the obtained IP address information or geolocation information in the current aggregated flow record of that source.

In an embodiment consistent with the system described above, for each distinct source identified in the source fields of the current network flow records, analyzing the current aggregated flow record comprises: converting the current aggregated flow record of that source into a feature vector; evaluating the converted feature vector by the anomaly detection module in order to produce a probability of similarity of the converted feature vector to previous such activity of that source, wherein the anomaly detection module is trained through machine learning on previous converted feature vectors of that source from the previous time periods to establish a basis of comparison for the previous such activity of that source; comparing the produced probability to a predefined threshold probability; and detecting the anomalous activity in that source when the produced probability is below the threshold probability, and otherwise not recognizing the anomalous activity of that source.

In an embodiment consistent with the system described above, acting in response to detecting the anomalous activity in that source comprises one or more of: generating an alert of the detected anomalous activity of that source; reporting, to an analyst, the detected anomalous activity of that source; and correlating the detected anomalous activity of that source to other activity of that source.

According to yet another aspect of the disclosure, a non-transitory computer readable medium (CRM) is provided. The CRM has computer instructions stored therein that, when executed by a processing circuit, cause the processing circuit to carry out an automated process of detecting anomalous activity in a private computer network. The process comprises: collecting, over a current time period at an ingesting network device of the private computer network, non-routable network packets routed to the ingesting network device from one or more other network devices of the private computer network; parsing the current collected network packets into corresponding current network flow records each including a source field and a destination field, the source field identifying a source node within the private computer network, the destination field representing a non-routable network address; and for each distinct source identified in the source fields of the current network flow records: aggregating the current network flow records of that source into a current aggregated flow record; analyzing the current aggregated flow record using an anomaly detection module trained through machine learning on previous aggregated flow records of that source from previous time periods in order to detect anomalous activity in that source; and acting in response to detecting the anomalous activity in that source.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1:
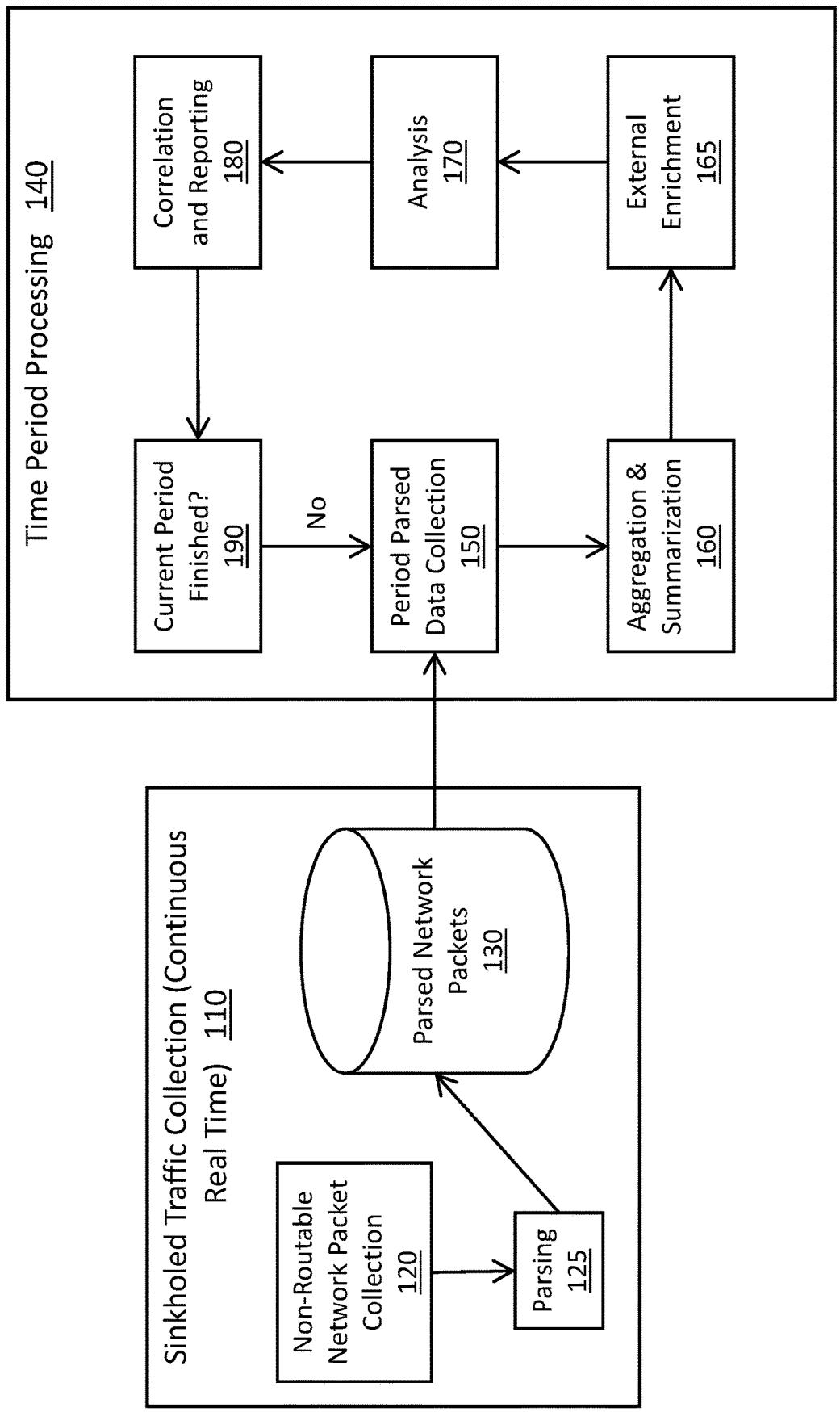
FIG. 1 is a block diagram of an example system for detecting malicious activity in a computer network through detecting anomalies in sinkholed network traffic, according to an embodiment.

Example embodiments of the present disclosure are directed to techniques of detecting malicious activity in a computer network through detecting anomalies in sinkholed network traffic. When malware of an adversary successfully infiltrates or compromises a computer network, it looks for additional targets to attack or for connections to external hosts to exfiltrate data, and notifies the adversary that it successfully compromised an internal host and is ready to receive new commands. As the malware is unlikely to know the internal network and how it is configured, the malware is more likely to connect to an internal address that is not assigned to a host or to go to an external address through a network route that does not exist. This results in sinkholed network traffic. Example embodiments are directed to collecting, aggregating, and analyzing this sinkholed traffic in order to detect anomalies. These detected anomalies can then be further analyzed to determine if they are indicative of malicious network activity (e.g., malware).

As discussed earlier, existing network security controls have significant shortcomings for internal computer networks. Most security controls are for external threats, to prevent infiltration or compromising of the computer network from outside. However, such infiltration is inevitable given the need for external communication between the computing devices of the network and computing devices outside the network. Most internal security controls detect malicious activity by comparing the activity with already defined patterns of malicious activity. These controls, however, do not work well for new types of attacks, or for malicious activities that are similar to legitimate activities. Other internal security controls rely on anomaly detection to detect such malicious activities. Most network anomaly detection solutions, however, rely on stable network activity in order to differentiate such activity from anomalous activity. Unfortunately, most networks exhibit frequently changing behavior. Furthermore, increasing the detection threshold for such anomaly detection solutions only increases the false negative rate. In addition, such solutions usually analyze all communications in the network, and can be very computationally, memory, and storage intensive.

It is in regard to these and other problems that embodiments of the present disclosure are directed to effective techniques for detecting malicious activity through detecting anomalies in sinkholed traffic. In an example embodiment, all network devices (e.g., routers, switches, firewalls, and the like) are configured (such as by code) to route non-routable traffic to a computing device. The computing device, in turn, is configured (such as by code) to parse the received network packets into corresponding network flow records, which summarize the key characteristics of the network flow. The computing device is further configured to, on a periodic basis (such as every six hours), aggregate and summarize the parsed network flow records for each distinct source during the period. This aggregation results in a single record for each host (source) in that period, and contains information regarding number of connections, unique ports, and unique destinations visited during that period.

The computing device is further configured to enrich these aggregation records with additional intelligence. The computing device is further configured to convert these enriched records into corresponding feature vectors, and to evaluate each feature vector against a machine learning model that is fit using the corresponding host's previous profile or records. This anomaly detection evaluation produces a probability of how similar the host's current behavior to its previous behavior. The computing device is further configured to compare this probability to a defined threshold and, if the probability is below the threshold, determine the host behavior during that period to be anomalous. If there is anomalous behavior determined to take place for a host, the computing device is further configured to take additional action, such as correlate the anomalous behavior to other host activities, or report the anomalous behavior directly to a security analyst for further analysis and investigation.

Example embodiments of the present disclosure provide for a system and method for detecting anomalous activity by analyzing sinkholed (e.g., non-routable) network traffic. These techniques take advantage of common behavioral traits of different adversarial threats, tactics, and procedures in order to identify anomalous activities within the network. These anomalous activities can indicate active malware. The techniques begin with configuring all network devices (e.g., routers, switches, firewalls, and the like) to route all non-routable traffic, including IP address ranges that are not routable, to a device that parses the network packets into network flow records. On a periodic basis, these network flow records for each distinct source are aggregated and summarized, resulting in a single record for each host that contains information regarding number of connections, unique ports, and unique destinations of that source during that period. This aggregated flow record is then enriched with additional intelligence. After that, the record is converted into a feature vector and evaluated against a machine learning model that is fitted using the host's previous profile/records. The anomaly detection process produces a probability of how similar the host's current behavior is to its previous behavior. This probability is then compared to a defined threshold. Current host activities that are below the threshold are correlated with other host activities or reported directly to a security analyst for further analysis and investigation.

Example embodiments of these features and techniques are illustrated in FIGS. 1-8 and described in the text that follows.

FIG. 1 is a block diagram of an example system 100 for detecting malicious activity in a computer network (such as a private computer network) through detecting anomalies in sinkholed network traffic, according to an embodiment. The computer network can be for an enterprise, linking all the computing devices of the enterprise through a communication network. The system 100 employs a method that includes six main steps. These are collection 120, parsing 125, aggregation 160, enrichment 165, analysis 170, and reporting 180.

Figure 2:
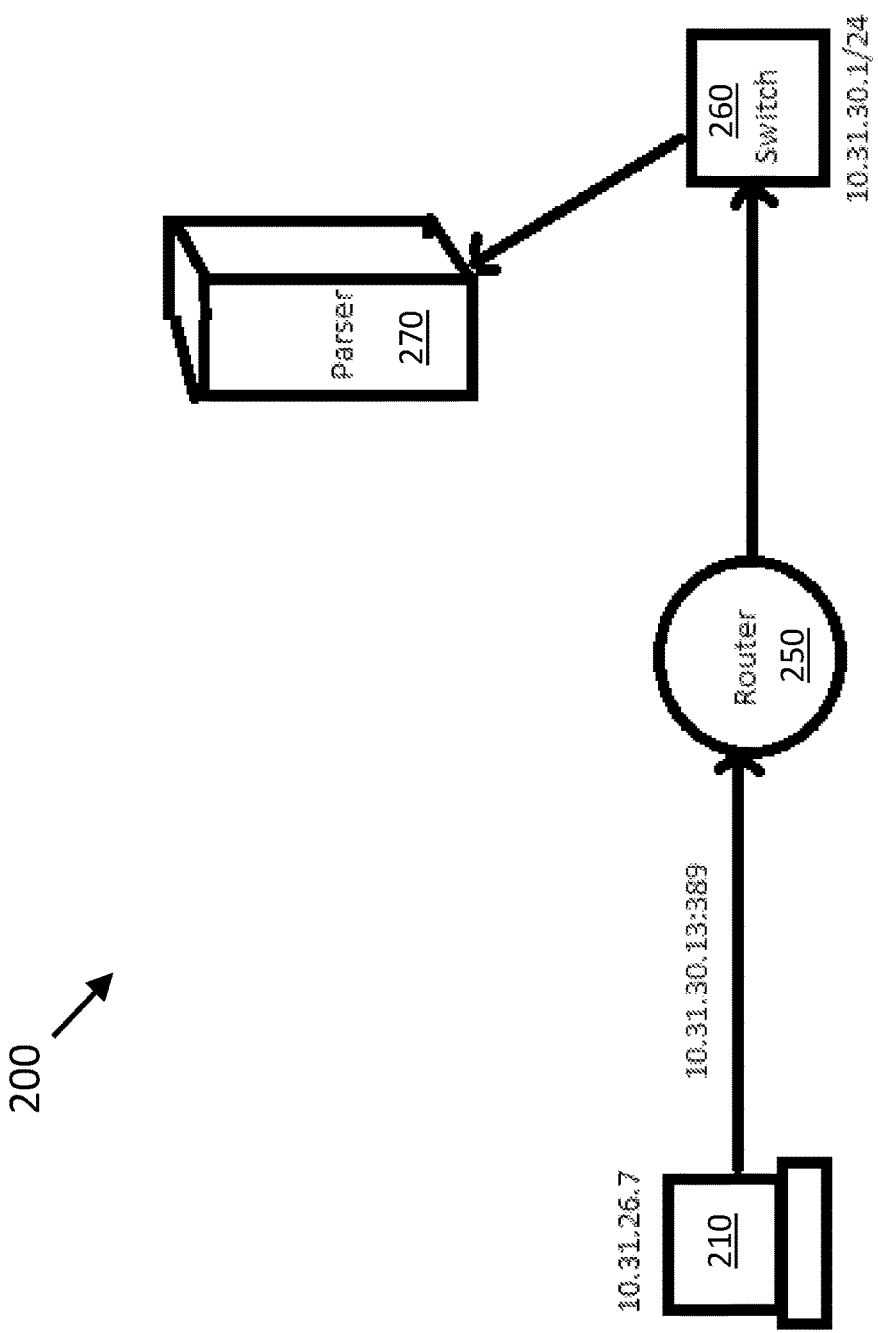
FIG. 2 is a schematic diagram of an example sinkholed network communication, in this case to a nonexistent network address (internal), being directed to a sinkholed traffic collection node, according to an embodiment.
Figure 3:
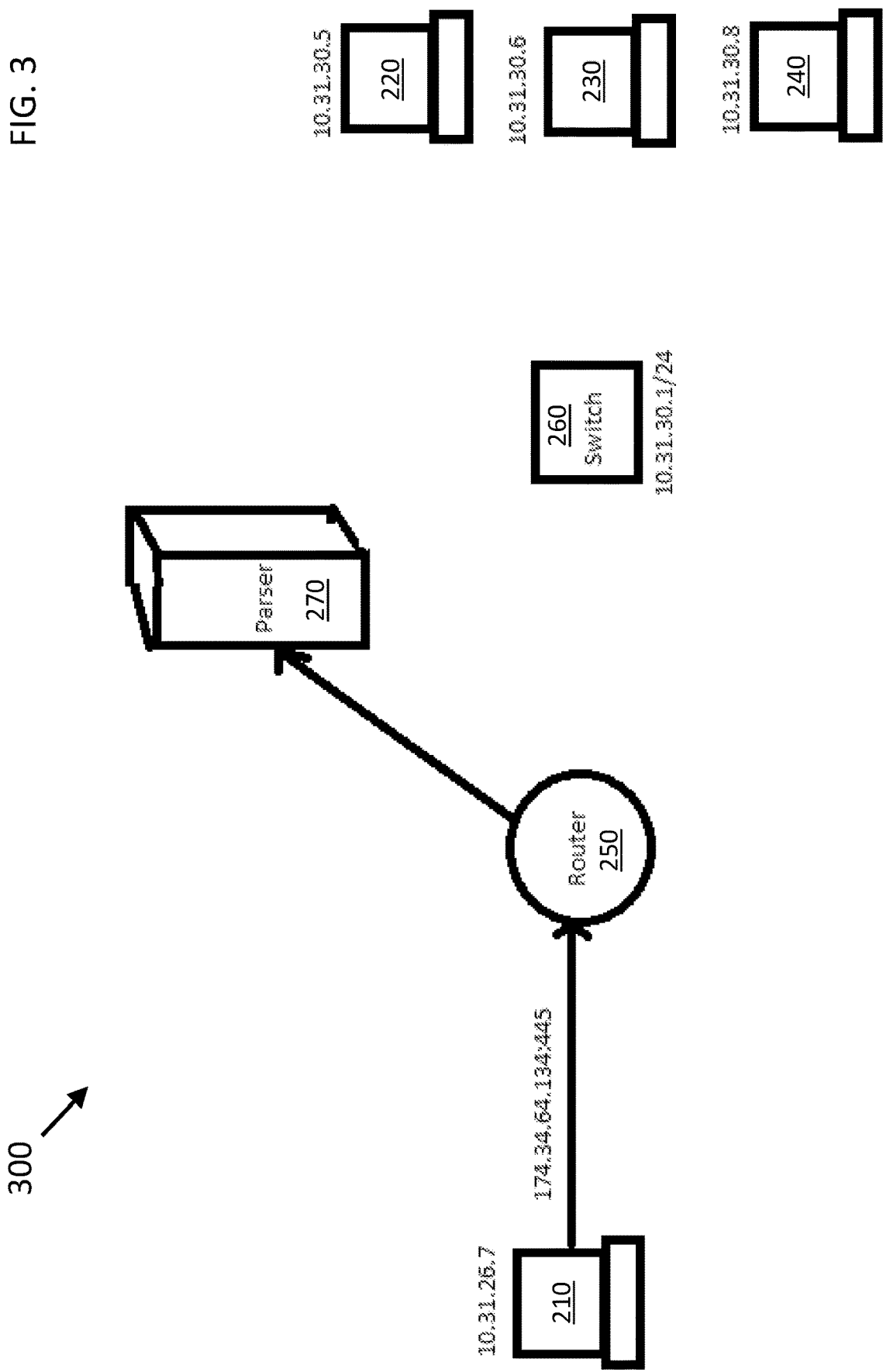
FIG. 3 is a schematic diagram of an example sinkholed network communication, in this case to an external network address and not via a proxy server, being directed to the sinkholed traffic collection node of FIG. 2, according to an embodiment.

FIG. 2 is a schematic diagram of an example sinkholed network communication 200, in this case to a nonexistent network address (internal), being directed to a sinkholed traffic collection node (or parser) 270, according to an embodiment. FIG. 3 is a schematic diagram of an example sinkholed network communication 300, in this case to an external network address and not via a proxy server, being directed to the sinkholed traffic collection node 270 of FIG. 2, according to an embodiment. Common to both communications 200 and 300 is the host node (source) or computing device 210, other network-connected nodes or computing devices 220, 230, and 240, a router or routing device 250 (for routing network communications to the appropriate switch, proxy server, or other network device), a switch or switching device 260 for transferring network traffic to a subset of nodes or other devices, and the sinkholed traffic collection node or parser 270 for collecting and parsing sinkholed network traffic.

In further detail, the system 100 of FIG. 1 breaks up the processing into two broad tasks: sinkholed traffic collection 110 and time period processing 140. Each of these tasks, for example, can be performed by a separate processing engine (such as a microprocessor or custom logic) configured (e.g., by code or other logic) to carry out the task. In some embodiments, the sinkholed traffic collection 110 takes place continuously and in real time. In some embodiments, the time period processing 140 takes place periodically, such as every time period (e.g., six hours) using the collected sinkholed network traffic for that time period. The sinkholed (e.g., non-routable or undeliverable) network traffic can indicate anomalous behavior or activity. The anomalous behavior common to a host, in turn, can indicate whether the host has been infiltrated or compromised by malware.

The communication network includes network devices such as routers, switches, and firewalls. These network devices are configured (such as by programming) to route any undeliverable or non-routable network traffic (such as sinkholed traffic) to a receiving device, such as a processor or other circuit configured (e.g., by code or other logic) to perform the sinkholed traffic collection 120. In the collection phase 120, these network devices are configured to send non-routable traffic intended for internal (e.g., communication 200 in FIG. 2) or external (e.g., communication 300 in FIG. 3) IP addresses instead to a specific device (such as parser 270) in the network for collection and processing. The network traffic communication can be non-routable for many reasons, such as the destination address is non-existent (e.g., communication 200 in FIG. 2) or the address is external and a proxy server needs to be used to reach it (e.g., communication 300 in FIG. 3).

After the non-routable network packet collection 120, the detection circuit (such as parser 270) performs the parsing 125 of the collected network packets into corresponding network flow records, such as parsed network packets 130. Each network flow record includes a source field (identifying a source node of the network communication within the computer network, such as an IP address) and a destination field (representing a non-routable network address). The time period processing 140 processes the parsed network packets 130 for each source collected (or time stamped) in the current time period. The time period processing 140 can be performed by the same detection circuit (such as parser 270) that performed the sinkholed traffic collection 110. The time period processing 140 includes identifying or collecting 150 those parsed network packets of the source for the current time period. It further includes aggregating or summarizing 160 the network flow records of the source for that period into a single current aggregated flow record (representing the current time period). The time period processing 140 further includes enrichment 165 of external addresses collected in the aggregated flow records, such as adding address information or geolocation information for each external address (outside the network) appearing as a destination in the non-routable traffic.

In addition, the time period processing 140 includes analyzing 170 the current aggregated flow records using an anomaly detection module. The anomaly detection module is trained through machine learning on aggregated flow records of the source from previous time periods (e.g., previous aggregated flow records) in order to detect anomalous activity in the source during the current time period. The time period processing further includes correlating and reporting 180 the source if the anomaly detection module identifies the current aggregated flow record as anomalous behavior of the source based on the previous aggregated flow records. For instance, a network operator can be alerted to the possible malicious activity of the source in order to perform a follow-up investigation. Finally, the time period processing 140 is repeated 190 for each distinct source appearing in the parsed network packets 130 for the current time period.

Figure 4:
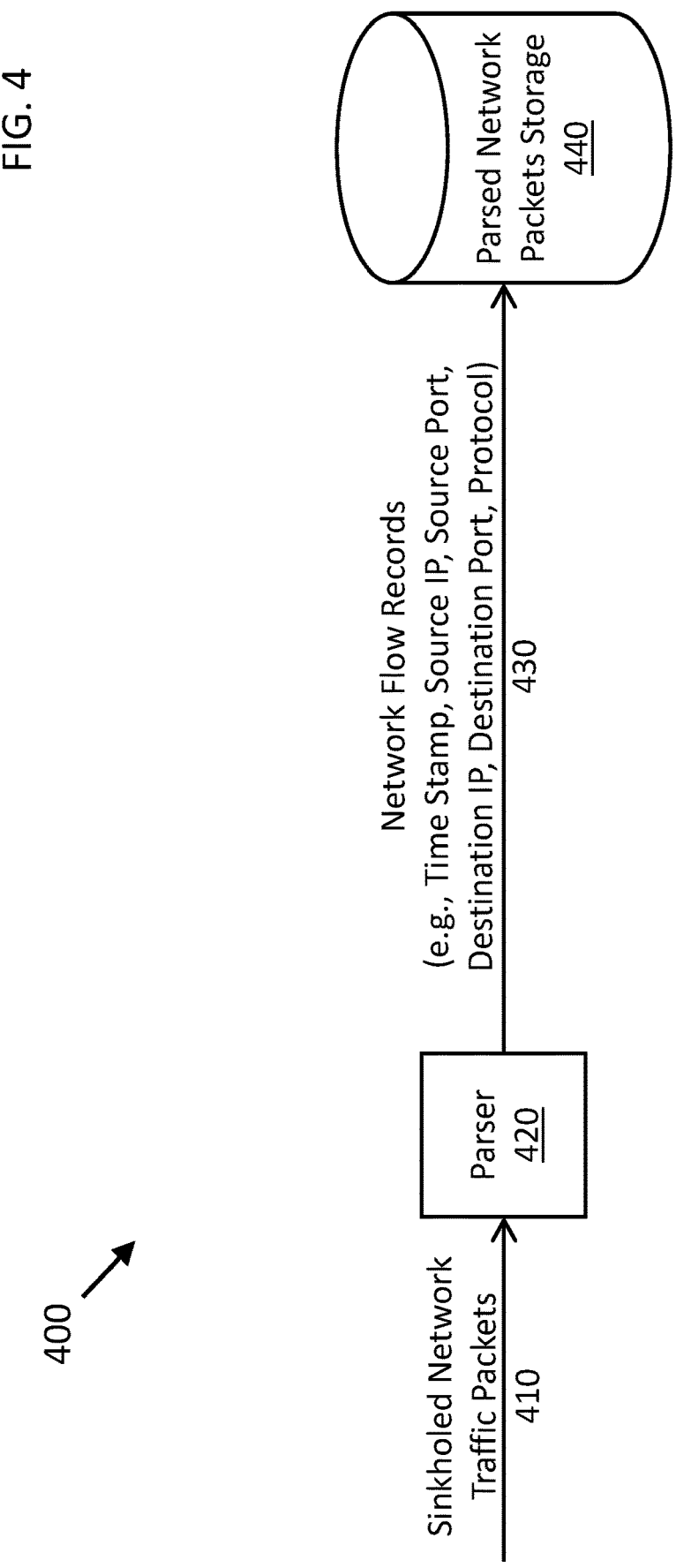
FIG. 4 is a block diagram of an example sinkholed network packet parsing and storage, such as for use with sinkholed traffic collection, according to an embodiment.

FIG. 4 is a block diagram of an example sinkholed network packet parsing and storage 400, such as for use with sinkholed traffic collection (e.g., non-routable network packet collection 120), according to an embodiment. In the parsing phase (such as parsing 125), sinkholed network traffic packets 410 are directed from the network devices (e.g., at the point of sinkholed address detection) to a receiving device or parser 420. The packets 410 may include extraneous data not needed for the network flow analysis. Accordingly, the parser 420 parses (or extracts and formats) the needed fields to describe the corresponding network flow for each packet (or set of packets of the same communication), and builds a network flow record (having a fixed or predictable format or layout) from these extracted fields. For instance, for the parsing technique 400, the extracted fields 430 include a time stamp, a source IP address, a source port number, a destination IP address, a destination port number, and a protocol. The network flow records 430 are stored in a file or indexed in a network flow database, which in turn is stored on a nontransitory network storage device 440, such as a disk drive or a flash drive.

Figure 5:
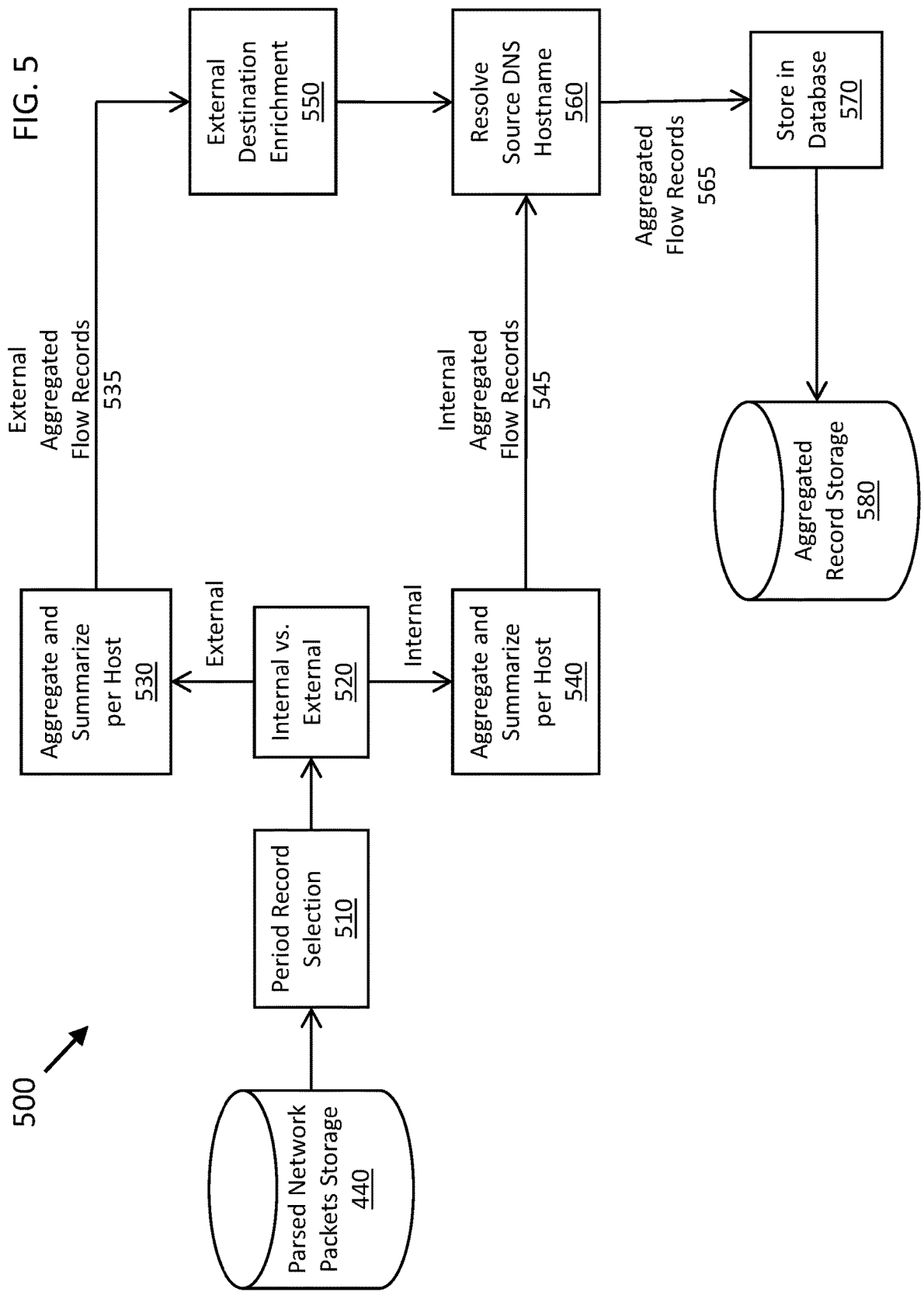
FIG. 5 is a block diagram of an example network flow record aggregation and summarization processing, according to an embodiment.

FIG. 5 is a block diagram of an example network flow record aggregation and summarization processing 500 (such as aggregation and summarization 160), according to an embodiment. FIG. 5 picks up where FIG. 4 left off, with parsed network packets (also referred to as network flow records) stored in a parsed network packets storage 440. The processing can be performed by a detection circuit (e.g., microprocessor, custom logic) programmed or otherwise configured to perform the aggregation and summarization. Processing begins with the current period record selection 510, which is done on a source-by-source basis, selecting all the network flow records from the parsed network packets storage 440 belonging to one source for the current time period. Here, source refers to the origination of the network communication, such as a network node (e.g., processing device connected to the network and having a unique IP address). These network flow records are then aggregated and summarized, and the aggregated flow records 565 are stored in another nontransitory storage device as aggregated record storage 580.

In further detail, in the aggregation phase 500 represented by FIG. 5, an aggregation module (e.g., detection circuit) reads or selects 510 network flow records for a specific period (such as six hours) for each source on a periodic basis. The records for each source are split or segregated 520 into two groups: internal (representing internal to internal traffic within the network) and external (representing internal to external traffic from within the network to a destination outside the network). For each communication source the records are aggregated and summarized, such as external aggregation and summarization 530 to produce external aggregated flow records 535 and internal aggregation and summarization 540 to produce internal aggregated flow records 545. In some embodiments, the detection circuit is configured by code to reduce all the external network flow records for a source for one period to a single external aggregated flow record and all the internal network flow records to a single internal aggregated flow record.

In some embodiments, the resultant per source aggregated flow record (internal or external) for a corresponding time period includes these fields: total connections, number of unique destinations, destination IP list, number of unique destination ports, and destination port list. In further detail, total connections includes the number of non-routable connections initiated by the source during this time period, number of unique destinations includes the number of unique IP addresses the source host has tried to communicate with during this time period, destination IP list includes a list of the destination IP addresses that the source (or source IP or source IP address) has tried to communicate with during this time period, number of unique destination ports includes the number of unique destination ports the source has tried to communicate to during this time period, and destination port list us a list of the ports the source IP address has tried to communicate to during this time period.

The aggregation phase 500 further includes external destination enrichment 550, during which further address or geolocation information for the non-routable external destination IP addresses are determined (e.g., looked up) and added to the external aggregated flow record. This further information is not part of the network packets or external network flow records. The aggregation phase 500 further includes resolving 560 the source hostname using domain name system (DNS) records and adding the resolved hostnames to the aggregated flow records. In addition, the internal flow records 545 and external flow records 535 are combined into aggregated flow records 565 after the enrichment 550 (such as during source DNS hostname resolution 560). The resultant aggregated flow records 565 are stored 570 in a database, such as on aggregated record storage 580. The enrichment 550 of external destination IP addresses will now be described in further detail with reference to FIG. 6.

Figure 6:
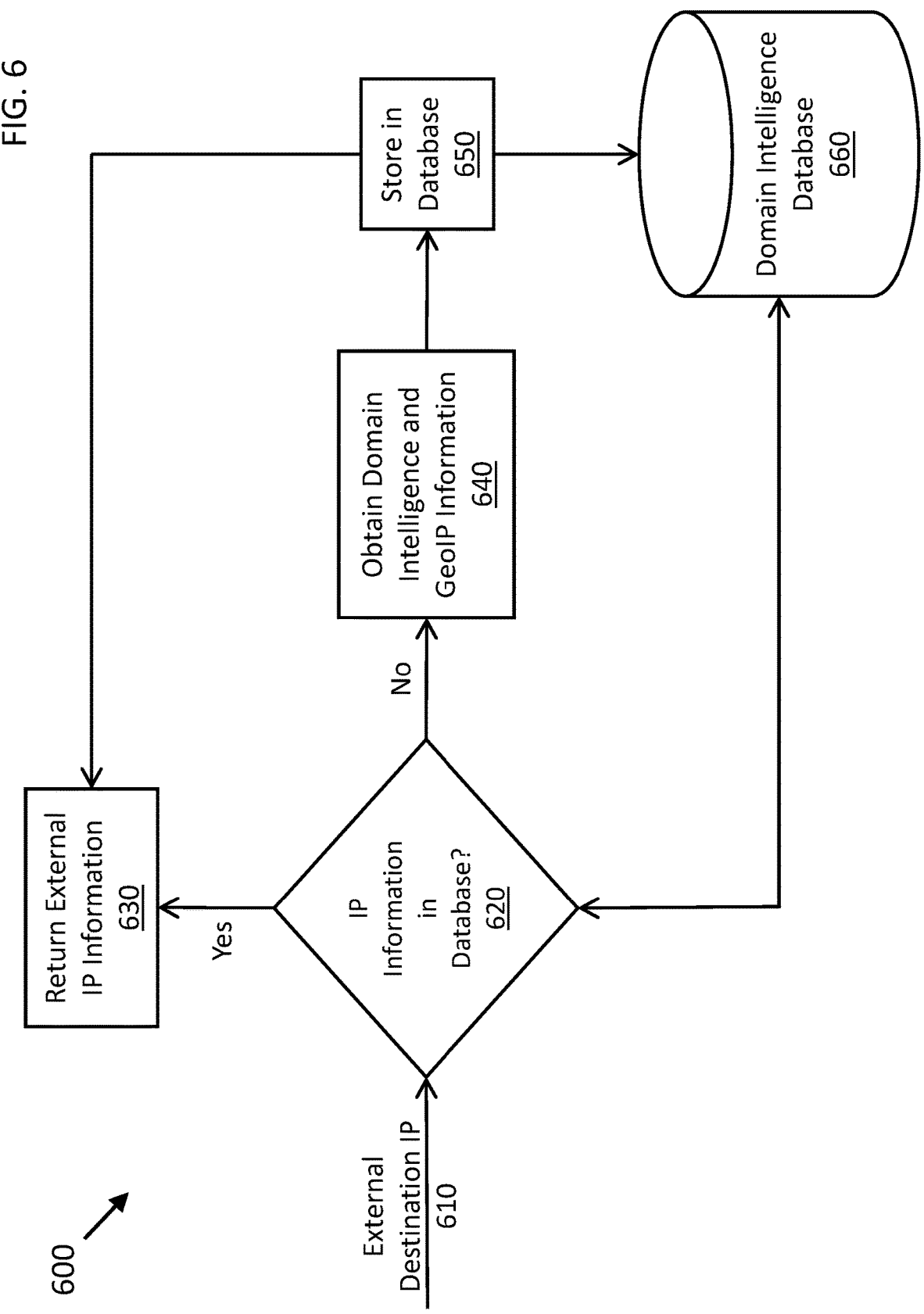
FIG. 6 is a schematic diagram of an example external flow record enrichment, according to an embodiment.

FIG. 6 is a schematic diagram of an example external flow record enrichment 600 (such as external enrichment 165 and external destination enrichment 550), according to an embodiment. This process may be performed by the same detection circuit (that has been programmed to perform the process) discussed earlier. Processing begins with receiving 610 the next external destination IP address as part of the external aggregated flow record handling.

In the enrichment phase 600, the enrichment module (e.g., detection circuit) first checks 620 the domain intelligence database 660 for the next external IP address 610. The domain intelligence database 660 is a repository of IP intelligence and geolocation information for previously searched external destination IP addresses (e.g., as part of previous enrichment steps). If there is already an entry in the database 660 for the next external IP address 610, the enrichment phase 600 returns the external IP information 630 stored earlier. Otherwise, the enrichment module is configured (e.g., by code) to search various external sources for the domain intelligence and Internet geolocation (GeoIP) information 640. The located and fetched GeoIP information 640 is then stored 650 in the domain intelligence database 660 and also returned 630 to the caller of the enrichment phase 600.

Figure 7:
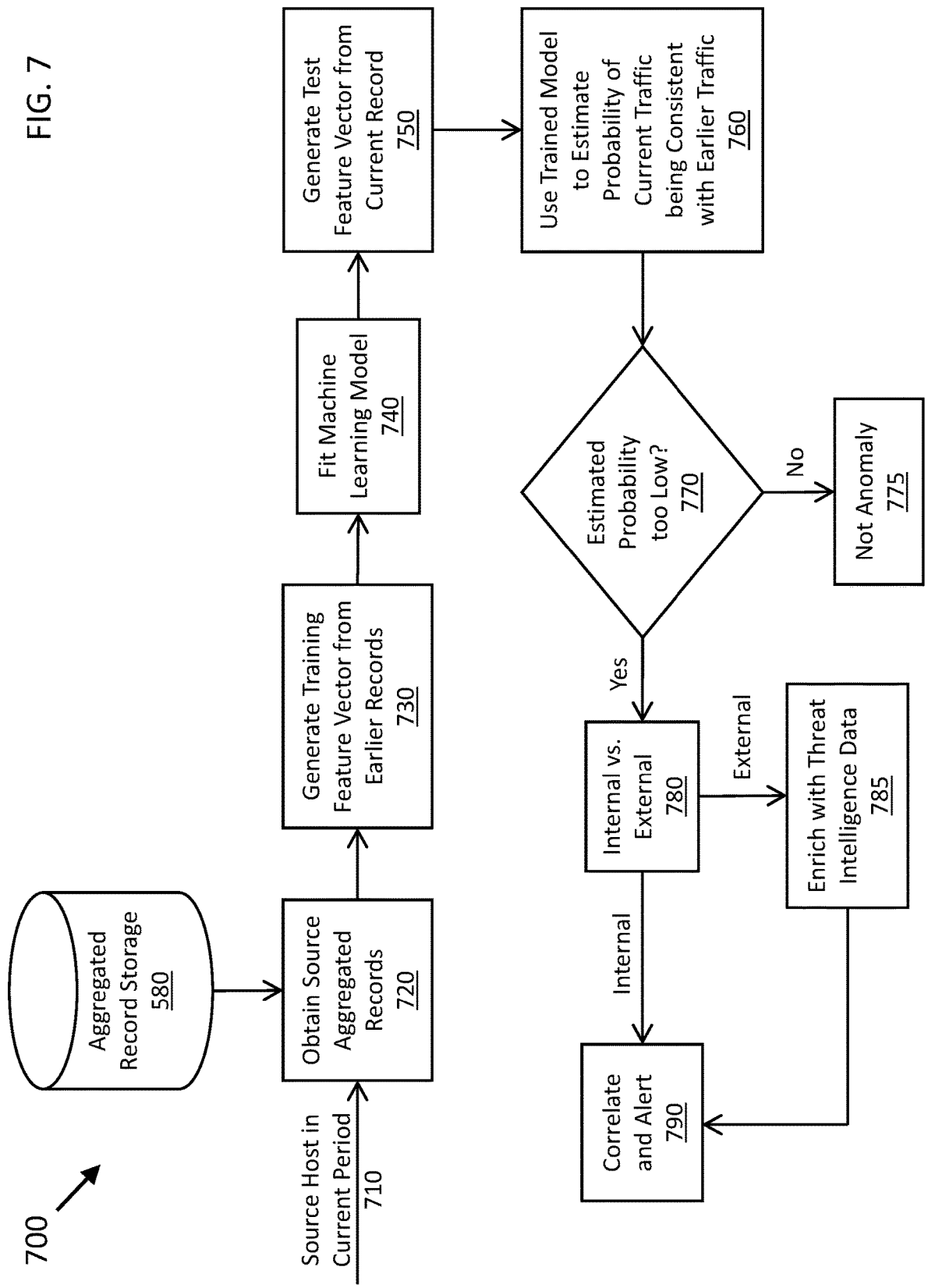
FIG. 7 is a flow diagram of an example current period analysis (or anomaly detection), according to an embodiment.

FIG. 7 is a flow diagram of an example current period analysis (or anomaly detection) 700 (such as analysis 170), according to an embodiment. The analysis 700 can be performed by the same detection circuit (or other electronic circuit) programmed or otherwise configured to carry out the analysis routine. The processing is performed on a source host (or source) basis for the current period to see if anomalous behavior is detected in the source 710 whose sinkholed network activity is being analyzed. Processing begins for the source host with obtaining 720 the aggregated flow record for the source during the current period, such as from the aggregated record storage 580. In addition, depending on factors such as update or training frequency of the machine learning model, additional (previous or earlier) aggregated flow records from previous or earlier time periods are also obtained 720 from the aggregated record storage 580.

Continuing, in the analysis phase 700, a training feature vector is generated 730 for each source host that has previous or earlier aggregated flow records. In some embodiments, the training feature vector for each source is generated earlier and then stored or saved for retrieval during the analysis phase 700. The training feature vector is generated using the source host stored historical records (e.g., previous aggregated flow records for the source host from aggregated record storage 580) through the feature generator module (described in further detail below with reference to FIG. 8). The training feature vector is used to fit 740 a machine learning anomaly detection model using a machine learning algorithm such as multivariate Gaussian distribution anomaly detection. A test feature vector for the host activity during the current period is also generated 750.

Using the fitted model, the host feature vector for current period probability is estimated 760, i.e., the probability of the (current) host activity happening based on the (previous) host's historical activities. The estimated probability is compared 770 to a user defined threshold (e.g., a probability threshold designed to differentiate normal activity from anomalous activity). If the probability is less than the threshold, the record is sent to the reporting module (e.g., to be reported as anomalous), such as via external vs. internal address determination 780. Otherwise, the probability is at least the threshold, so no anomaly is detected 775. In the external vs. internal address determination 780, external destination IP addresses that are part of the current source aggregated flow record are further enriched 785 with threat intelligence data (e.g., in a similar manner to the enrichment data obtained as part of enrichment 165 or 550). This is followed by correlating 790 with other source activity and alerting 790 (e.g., a network operator) of the anomalous behavior and the (internal and enriched external) IP address information that make up the source's current aggregated flow record. Depending on factors such as the severity of the probability comparison or the number or type of concerning IP addresses, an investigation may be launched as a result of this detection and identification.

In some embodiments, when the host does not have any previous aggregated flow records in the database (and thus cannot have a previous set of records from which to build a training feature vector), the current aggregated flow record is sent to the reporting module as well. That is, the behavior is deemed anomalous initially to prime the machine learning model (e.g., after confirmation from a more knowledgeable source, such as a network operator, that the behavior is not actually anomalous). Once primed, the anomaly detection module can proceed as intended, comparing present feature vectors to training feature vectors generated from previous aggregated flow records in order to detect anomalous activity. In this way, a system operator or other qualified person can make the initial determination if there is an anomaly, and afterwards the determination is left to the machine learning model to make.

There are many ways to handle updates to the host fitted machine learning model. In some embodiments, the host fitted machine learning model is stored and reused, with occasional refitting (e.g., daily, weekly) versus being refitted every period. In this way, the stored fitted model is used with each next period for a while. In some embodiments, the fitted machine learning model is incrementally trained using the new feature vector. In some embodiments, the whole model is refitted, such as every period using all stored records accumulated up until then. In some embodiments, when there are none or not enough host historical records to fit the model, synthetic data is generated, where the generated data is similar to previous host activities.

Figure 8:
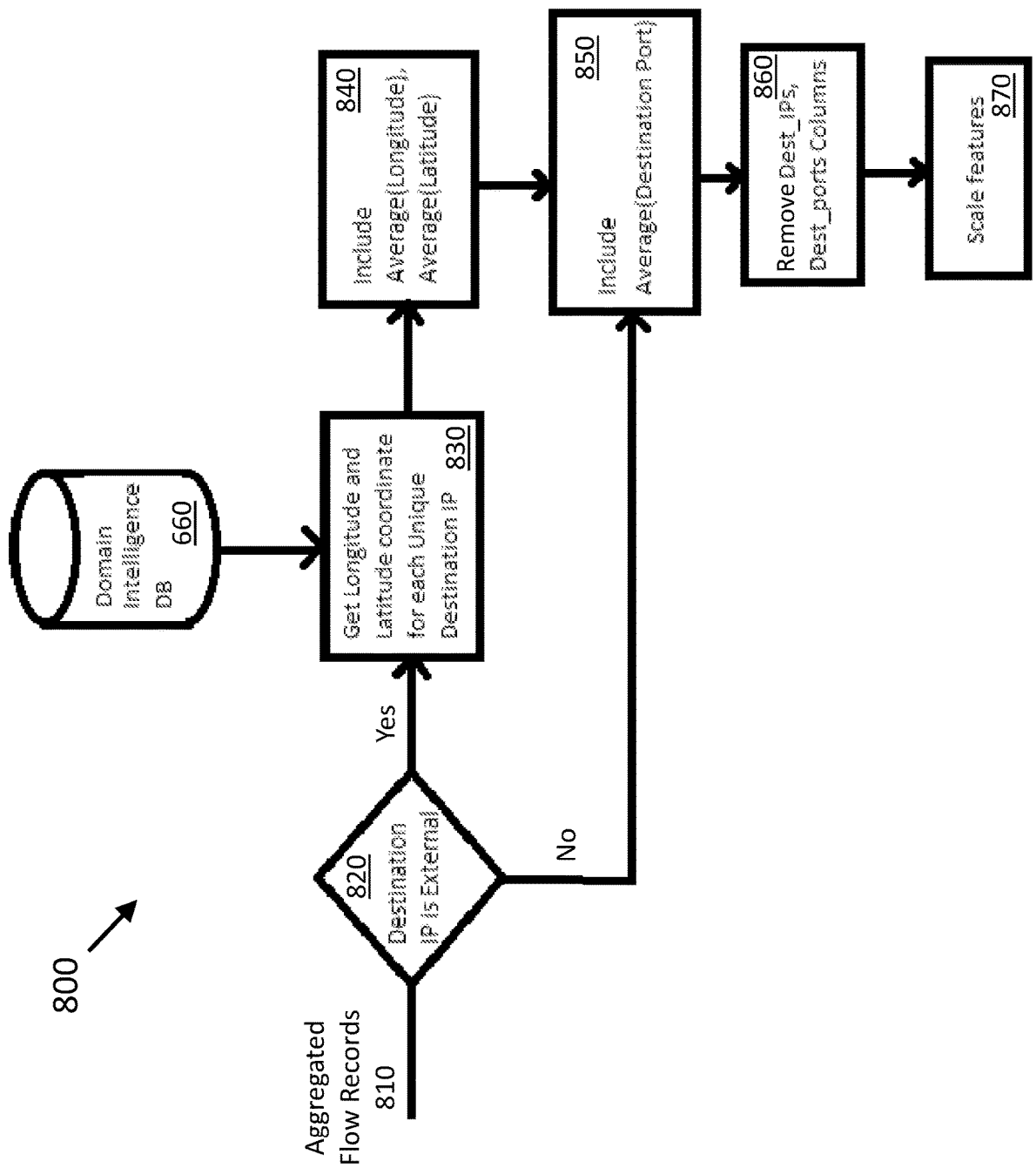
FIG. 8 is a schematic diagram of an example feature generator, according to an embodiment.

FIG. 8 is a schematic diagram of an example feature generator 800, according to an embodiment. The feature generator 800 can be implemented on a processor or logic circuit configured (e.g., by code) to carry out the functions of feature generation. FIG. 8 describes how the example feature vector is generated using the host aggregated and summarized record and enrichment data for external destination IP addresses. In the reporting phase 800, the aggregated flow record is further enriched, correlated with other host activities, and reported to a security analyst for further investigation. If the security analyst deems the alert to be a false positive, such as resulting from a misconfiguration, a report is sent to an operations entity to fix it. The process is then repeated for succeeding time periods. The machine learning model is configured so that repeated activities resulting from misconfigurations and false positives will be learned to be ignored and not generate alerts in the future. All phases are repeated whenever the current period has finished.

In further detail, in the example feature generator 800, an anomalous aggregated flow record 810 is supplied as input. A test 820 is then performed on any destination IP address in the aggregated flow record 810 to see if it an external IP address (e.g., external to the computer network), with further enriching to be performed on any such IP addresses. For instance, in the example feature generator 800, enriching includes obtaining 830 the longitude and latitude coordinates for each unique destination IP address. These coordinates are available, for example, from the domain intelligence database 660 described earlier with reference to FIG. 6. The average longitude and the average latitude of these different coordinates is then computed 640. These values become features, e.g., easily computed numbers whose values fluctuate significantly (yet predictably, like hash values) when their base components (e.g., destination IP addresses, in this case) fluctuate, but otherwise remain unchanged.

The example feature generator 800 continues with calculating 850 the average destination port value from all the destination ports in the aggregated flow record 810. Like the average longitude and latitude, average destination port works well as a feature since random destination ports appearing in the aggregated flow record will cause this feature value to fluctuate. The lists of destination IP addresses and destination ports are then deleted 860 from these aggregated flow records as their size can be arbitrarily large and much of their usefulness can be summarized in features like the example ones shown here. Finally, the feature values are scaled 870 in order to keep their range in a consistent uniform format, which helps with feature processing and anomaly determination.

The different logic components (e.g., detection circuit) described throughout can be implemented in a variety of ways, including hardware (e.g., custom logic circuits), firmware (such as with customizable logic circuits), or software (e.g., computer instructions executable on a processing circuit such as an electronic processor or microprocessor). These components can include computing, control, or other logic circuits configured (e.g., programmed) to carry out their assigned tasks. In some example embodiments, their logic is implemented as computer code configured to be executed on a computing circuit (such as a microprocessor) to perform the steps that are part of the technique.

The automated methods described herein can be implemented by an electronic circuit configured (e.g., by code, such as programmed, by custom logic, as in configurable logic gates, or the like) to carry out the steps of the method. Some or all of the methods described herein can be performed using the components and techniques illustrated in FIGS. 1-8. In addition, these methods disclosed herein can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM) having computer instructions stored therein that, when executed by a processing circuit, cause the processing circuit to carry out an automated process for performing the respective methods.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated method for detecting anomalous activity in a private computer network, the method comprising:
   collecting, over a current time period by a detection circuit of an ingesting network device of the private computer network, non-routable network packets routed to the ingesting network device from one or more other network devices of the private computer network;
   parsing, by the detection circuit, the current collected network packets into corresponding current network flow records each including a source field and a destination field, the source field identifying a source node within the private computer network, the destination field representing a non-routable network address; and
   for each distinct source identified in the source fields of the current network flow records:
      aggregating, by the detection circuit, the current network flow records of the respective distinct source into a current aggregated flow record,
         wherein the current aggregated flow record of each source comprises a list of destination IP addresses, and
         wherein the list of destination IP addresses includes external destination IP addresses whose respective IP addresses are external to the private computer network;
   enriching, for each distinct source identified in the source fields of the current network flow records, the external destination IP addresses of the current aggregated flow record of each distinct source to include additional information about the external destination IP addresses,
      wherein the additional information about the external destination IP addresses is not part of the current network flow records of each respective distinct source;
   analyzing, by the detection circuit, the current aggregated flow record using an anomaly detection module trained through machine learning on previous aggregated flow records of the respective distinct source from previous time periods in order to detect anomalous activity in the respective distinct source; and
   acting, by the detection circuit, in response to detecting the anomalous activity in the respective distinct source.

2. The method of claim 1, wherein the non-routable network address comprises a non-existent destination address or an external destination address requiring a proxy server in order to reach.

3. The method of claim 1, wherein the one or more other network devices comprise one or more routers, switches, or firewalls of the private computer network, or combinations thereof, and the one or more other network devices route all non-routable network packets to the ingesting network device.

4. The method of claim 1, wherein the current network flow records each comprise a corresponding time stamp, source Internet Protocol address (IP address), source port, destination IP address, destination port, and protocol.

5. The method of claim 4, wherein the current aggregated flow record of each source comprises information for the current time period regarding a number of non-routable connections initiated by the respective distinct source, a number of unique destination IP addresses, a number of unique destination ports, and a list of destination ports, as represented by the current network flow records of the respective distinct source.

6. The method of claim 1, wherein for each distinct source identified in the source fields of the current network flow records, enriching the external destination IP addresses of the current aggregated flow record of each distinct source comprises:
obtaining Internet Protocol (IP) address information or geolocation information about the external destination IP addresses in the current aggregated flow record of each distinct source, wherein the Internet Protocol (IP) address information or geolocation information about the external destination IP addresses in the current aggregated flow record is not part of the current network flow records of each respective distinct source; and
including the obtained IP address information or geolocation information in the current aggregated flow record of each respective distinct source.

7. The method of claim 1, wherein for each distinct source identified in the source fields of the current network flow records, analyzing the current aggregated flow record comprises:
converting the current aggregated flow record of the respective distinct source into a feature vector;
evaluating the converted feature vector by the anomaly detection module in order to produce a probability of similarity of the converted feature vector to previous such activity of the respective distinct source, wherein the anomaly detection module is trained through machine learning on previous converted feature vectors of the respective distinct source from the previous time periods to establish a basis of comparison for the previous such activity of the respective distinct source;
comparing the produced probability to a predefined threshold probability; and
detecting the anomalous activity in the respective distinct source when the produced probability is below the threshold probability, and otherwise not recognizing the anomalous activity of the respective distinct source.

8. The method of claim 1, wherein acting in response to detecting the anomalous activity in the respective distinct source comprises one or more of:
generating an alert of the detected anomalous activity of the respective distinct source;
reporting, to an analyst, the detected anomalous activity of the respective distinct source; and
correlating the detected anomalous activity of the respective distinct source to other activity of the respective distinct source.

9. The method of claim 1, further comprising repeating, by the detection circuit, the collecting, parsing, aggregating, analyzing, and acting for each of a plurality of disjoint time periods after the current time period.

10. An automated system for detecting anomalous activity in a private computer network, the system comprising:
a detection circuit; and
a non-transitory storage device storing instructions thereon that, when executed by the detection circuit, cause the detection circuit to:
collect, over a current time period at an ingesting network device of the private computer network, non-routable network packets routed to the ingesting network device from one or more other network devices of the private computer network;
parse the current collected network packets into corresponding current network flow records each including a source field and a destination field, the source field identifying a source node within the private computer network, the destination field representing a non-routable network address; and
for each distinct source identified in the source fields of the current network flow records:
aggregate the current network flow records of the respective distinct source into a current aggregated flow record,
wherein the current aggregated flow record of each source comprises a list of destination IP addresses, and
wherein the list of destination IP addresses includes external destination IP addresses whose respective IP addresses are external to the private computer network;
enrich each distinct source identified in the source fields of the current network flow records with the external destination IP addresses of the current aggregated flow record of each distinct source to include additional information about the external destination IP addresses,
wherein the additional information about the external destination IP addresses is not part of the current network flow records of each respective distinct source;
analyze the current aggregated flow record using an anomaly detection module trained through machine learning on previous aggregated flow records of the respective distinct source from previous time periods in order to detect anomalous activity in the respective distinct source; and
act in response to detecting the anomalous activity in the respective distinct source.

11. The system of claim 10, wherein the non-routable network address comprises a non-existent destination address or an external destination address requiring a proxy server in order to reach.

12. The system of claim 10, wherein the one or more other network devices comprise one or more routers, switches, or firewalls of the private computer network, or combinations thereof, and the one or more other network devices route all non-routable network packets to the ingesting network device.

13. The system of claim 10, wherein the current network flow records each comprise a corresponding time stamp, source Internet Protocol address (IP address), source port, destination IP address, destination port, and protocol.

14. The system of claim 13, wherein the current aggregated flow record of each source comprises information for the current time period regarding a number of non-routable connections initiated by the respective distinct source, a number of unique destination IP addresses, a number of unique destination ports, and a list of destination ports, as represented by the current network flow records of the respective distinct source.

15. The system of claim 10, wherein for each distinct source identified in the source fields of the current network flow records, enriching the external destination IP addresses of the current aggregated flow record of each distinct source comprises:
obtaining Internet Protocol (IP) address information or geolocation information about the external destination IP addresses in the current aggregated flow record of each distinct source, wherein the Internet Protocol (IP) address information or geolocation information about the external destination IP addresses in the current aggregated flow record is not part of the current network flow records of each respective distinct source; and including the obtained IP address information or geolocation information in the current aggregated flow record of each respective distinct source.

16. The system of claim 10, wherein for each distinct source identified in the source fields of the current network flow records, analyzing the current aggregated flow record comprises:

converting the current aggregated flow record of the respective distinct source into a feature vector;

evaluating the converted feature vector by the anomaly detection module in order to produce a probability of similarity of the converted feature vector to previous such activity of the respective distinct source, wherein the anomaly detection module is trained through machine learning on previous converted feature vectors of the respective distinct source from the previous time periods to establish a basis of comparison for the previous such activity of the respective distinct source;

comparing the produced probability to a predefined threshold probability; and detecting the anomalous activity in the respective distinct source when the produced probability is below the threshold probability, and otherwise not recognizing the anomalous activity of the respective distinct source.

17. The system of claim 10, wherein acting in response to detecting the anomalous activity in the respective distinct source comprises one or more of:

generating an alert of the detected anomalous activity of the respective distinct source;

reporting, to an analyst, the detected anomalous activity of the respective distinct source; and correlating the detected anomalous activity of the respective distinct source to other activity of the respective distinct source.

18. A non-transitory computer readable medium (CRM) having computer instructions stored therein that, when executed by a processing circuit, cause the processing circuit to carry out an automated process of detecting anomalous activity in a private computer network, the process comprising:

collecting, over a current time period at an ingesting network device of the private computer network, non-routable network packets routed to the ingesting network device from one or more other network devices of the private computer network;

parsing the current collected network packets into corresponding current network flow records each including a source field and a destination field, the source field identifying a source node within the private computer network, the destination field representing a non-routable network address; and for each distinct source identified in the source fields of the current network flow records:

aggregating the current network flow records of the respective distinct source into a current aggregated flow record, wherein the current aggregated flow record of each source comprises a list of destination IP addresses, and wherein the list of destination IP addresses includes external destination IP addresses whose respective IP addresses are external to the private computer network;

enriching, for each distinct source identified in the source fields of the current network flow records, the external destination IP addresses of the current aggregated flow record of each distinct source to include additional information about the external destination IP addresses, wherein the additional information about the external destination IP addresses is not part of the current network flow records of each respective distinct source;

analyzing the current aggregated flow record using an anomaly detection module trained through machine learning on previous aggregated flow records of the respective distinct source from previous time periods in order to detect anomalous activity in the respective distinct source; and acting in response to detecting the anomalous activity in the respective distinct source.

* * * * *